United States Patent [19]
Wu et al.

[11] Patent Number: 5,307,375
[45] Date of Patent: Apr. 26, 1994

[54] TWO STAGE ACCUMULATOR FOR USE IN UPDATING COEFFICIENTS

[75] Inventors: Allen Wu, San Diego; Woo H. Paik, Encinitas, both of Calif.

[73] Assignee: General Instrument Corporation, Hatboro, Pa.

[21] Appl. No.: 973,430

[22] Filed: Nov. 19, 1992

[51] Int. Cl.⁵ .............................................. H03K 5/159
[52] U.S. Cl. ...................................... 375/16; 375/14; 364/724.2; 333/28 R
[58] Field of Search .................... 375/11, 12, 13, 14, 375/15, 16; 364/724.19, 724.2; 333/18

[56] References Cited
U.S. PATENT DOCUMENTS

| | | | |
|---|---|---|---|
| 3,633,105 | 1/1972 | Lender et al. | 375/16 |
| 4,580,275 | 1/1986 | Pirani et al. | 375/16 |
| 5,134,475 | 7/1992 | Johnston et al. | 358/133 |

Primary Examiner—Stephen Chin
Assistant Examiner—Amanda T. Le
Attorney, Agent, or Firm—Barry R. Lipsitz

[57] ABSTRACT

A two stage accumulator is provided for updating coefficients. The accumulator is particularly useful in an adaptive equalizer. A first stage of the accumulator receives an error word and outputs sign and carry bits resulting from the addition of the error word and an N-bit LSB portion of a larger M-bit coefficient. A second stage is responsive to the sign and carry bits for updating the (M-N) MSB's of the M-bit coefficient. New error words are cyclically provided to the first stage during successive coefficient update cycles. The first stage can be implemented using an N-bit twos complement adder. The second stage can be implemented using an up/down counter. A leakage function is provided by causing the up/down counter to periodically skip over increment and decrement cycles.

20 Claims, 5 Drawing Sheets

TWO STAGE ACCUMULATOR FOR USE IN UPDATING COEFFICIENTS

BACKGROUND OF THE INVENTION

The present invention relates to an accumulator for use in updating coefficients, and more particularly to a two stage accumulator for updating the coefficients of an adaptive equalizer or the like.

Digital data, for example digitized video for use in broadcasting high definition television (HDTV) signals, can be transmitted over terrestrial very high frequency (VHF) or ultra high frequency (UHF) analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion, and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality, such as sixteen or thirty-two, bits of information are transmitted together in a pattern referred to as a "constellation".

In pulse amplitude modulation, each signal is a pulse whose amplitude level is determined by a transmitted symbol. In 16-QAM, symbol amplitudes of $-3, -1, 1$ and 3 in each quadrature channel are typically used. In bandwidth efficient digital communication systems, the effect of each symbol transmitted over a time-dispersive channel extends beyond the time interval used to represent that symbol. The distortion caused by the resulting overlap of received symbols is called intersymbol interference (ISI). This distortion has been one of the major obstacles to reliable high speed data transmission over low background noise channels of limited bandwidth. A device known as an "equalizer" is used to deal with the ISI problem.

In order to reduce the intersymbol interference introduced by a communication channel, rather precise equalization is required. Furthermore, the channel characteristics are typically not known beforehand. Thus, it is common to design and use a compromise (or a statistical) equalizer that compensates for the average of the range of expected channel amplitude and delay characteristics. A least mean square (LMS) error adaptive filtering scheme has been in common use as an adaptive equalization algorithm for many years. This algorithm is described in B. Widrow and M. E. Hoff, Jr., "Adaptive Switching Circuits" in IRE Wescon Conv. Rec., Part 4, pp. 96-104, Aug. 1960. The use of the LMS algorithm in an adaptive equalizer to reduce intersymbol interference is discussed in S. U. H. Qureshi, "Adaptive Equalization", *Proc. IEEE*, Vol. 73, No. 9, pp. 1349-1387, September 1987.

Commonly assigned, copending U.S. patent application Ser. No. 07/733,791 filed on Jul. 26, 1991 discloses a method and apparatus for updating coefficients in a complex adaptive equalizer. Specifically, convergence of a complex adaptive equalizer used in digital communications is substantially improved by updating all coefficients of the equalizer during each filter clock cycle. A plurality of successive delay stages are coupled to provide a plurality of sets of delayed signal data from an input signal. Each set of delayed data is multiplied by an error signal to provide a plurality of products. Each product is concurrently updated with previous product data to provide a plurality of sets of updated coefficients. The updated coefficient sets are selectively input to an equalizer filter stage.

In a specific embodiment illustrated in the aforementioned copending patent application, a plurality of parallel processing paths are used, each to update one of the products. Each of the parallel processing paths includes an adder having a first input for receiving one of the plurality of products, a second input and an output. A delay circuit is coupled to receive product data from the adder output and to feed delayed product data back to the second adder input. The parallel processing paths can further include means for truncating and/or adjusting the gain of the updated coefficients output from the adder. Sets of updated coefficients from the various parallel paths are multiplexed to provide a clocked stream of coefficient sets for input to the equalizer filter stage.

A disadvantage to using adders as accumulators in the implementation disclosed in the aforementioned copending patent application is that such devices require an inordinate amount of space in a very large scale integration (VLSI) integrated circuit. Thus, the use of a conventional adder and delay stage as an accumulator increases the cost and may decrease the performance of an adaptive equalizer implementation.

It would be advantageous to provide an improved implementation for an accumulator that can be used in connection with an adaptive equalizer or the like. Such an implementation should avoid the need for a long bit adder which requires substantial hardware and may slow down the equalizer processing speed. It would be further advantageous to provide such an accumulator implementation which will improve the convergence of the coefficients by dynamically maintaining limits on the coefficient magnitudes.

The present invention provides a two stage accumulator enjoying the aforementioned advantages.

SUMMARY OF THE INVENTION

In accordance with the present invention, a two stage accumulator is provided for use in updating coefficients. A first stage is coupled to receive an error word. The first stage outputs sign and carry bits resulting from the addition of the error word and an N-bit least significant bit (LSB) portion of a larger M-bit coefficient. A second stage is responsive to the sign and carry bits from the first stage for updating the (M-N) most significant bits (MSB's) of the M-bit coefficient. Means are provided for cyclically providing new error words to the first stage during successive coefficient update cycles.

In an illustrated embodiment, the new error words are derived from at least a portion of an M-bit coefficient that was updated during a previous coefficient update cycle. The first stage adds the new error word received during a coefficient update cycle to the N least significant bits of the M-bit coefficient from the previous coefficient update cycle to provide the sign and carry bits. The second stage is responsive to the sign and carry bits output from the first stage during each cycle to update the (M-N) most significant bits of the M-bit coefficient from the previous coefficient update cycle.

In the illustrated embodiment, the error word is an N-bit word. The first stage comprises an N-bit twos complement adder for adding the error word and the N-bit LSB portion to produce a sign bit, a carry bit, and an N-bit sum. The sign and carry bit are delayed for input to the second stage during a subsequent coefficient update cycle. The N-bit sum is also delayed for input to the adder as the N-bit LSB portion during the subsequent coefficient update cycle.

The second stage can comprise an up/down counter for selectively incrementing or decrementing the (M-N) most significant bits depending on the state of the sign and carry bits during a current coefficient update cycle. In a preferred embodiment, means are provided for inhibiting the incrementing of the (M-N) most significant bits if such incrementing would cause the (M-N) MSB's to exceed an upper boundary. Likewise, means are provided for inhibiting the decrementing of the (M-N) most significant bits if the decrementing would cause the (M-N) MSB's to drop below a lower boundary. Leakage function means are provided to cause the up/down counter to periodically skip incrementing and decrementing cycles. In an illustrated embodiment, first leakage function means are responsive to the number of incrementing cycles of the up/down counter over time. Second leakage function means are responsive to the number of decrementing cycles over time.

Means are also provided for preloading the up/down counter and the incrementing and decrementing inhibiting means with initialization data for at least a portion of the (M-N) most significant bits of the M-bit coefficient during an accumulator initialization cycle. Preloading of the incrementing and decrementing inhibiting means provides stability for an adaptive equalizer which uses the accumulator of the present invention. Preloading of the up/down counter is provided to deal with the echo problem in communication system implementations.

In a more specific embodiment, the present invention provides a two stage accumulator for use in updating coefficients in which the first stage includes an N-bit twos complement adder and the second stage includes an up/down counter. The N-bit twos complement adder has a first input coupled to receive an N-bit error word and a second input coupled to receive a previous N-bit sum from the adder. The adder also has a first output for outputting a new N-bit sum resulting from the addition of the error word and the previous sum, and a second output for outputting sign and carry bits resulting from the addition. The sums represent the N-bit least significant bit portions of an M-bit coefficient being cyclically updated. The up/down counter means in the second stage are responsive to the sign and carry bits from the second output of the adder. The up/down counter means update the (M-N) most significant bits of the M-bit coefficient. New error words are cyclically provided to the first stage adder for updating the M-bit coefficient.

The up/down counter means of the second stage selectively increment or decrement the (M-N) most significant bits, depending on the state of the sign and carry bits during a current coefficient update cycle. Means can be provided for inhibiting the incrementing and decrementing of the (M-N) most significant bits to prevent them from exceeding predetermined boundaries.

First delay means are coupled to the first output of the adder for delaying the new N-bit sum for input to the second input of the adder during a subsequent cycle. Second delay means are coupled to the second output of the adder for delaying the sign and carry bits for use in controlling the up/down counter during the subsequent cycle.

DETAILED DESCRIPTION OF THE INVENTION

Figure 1:
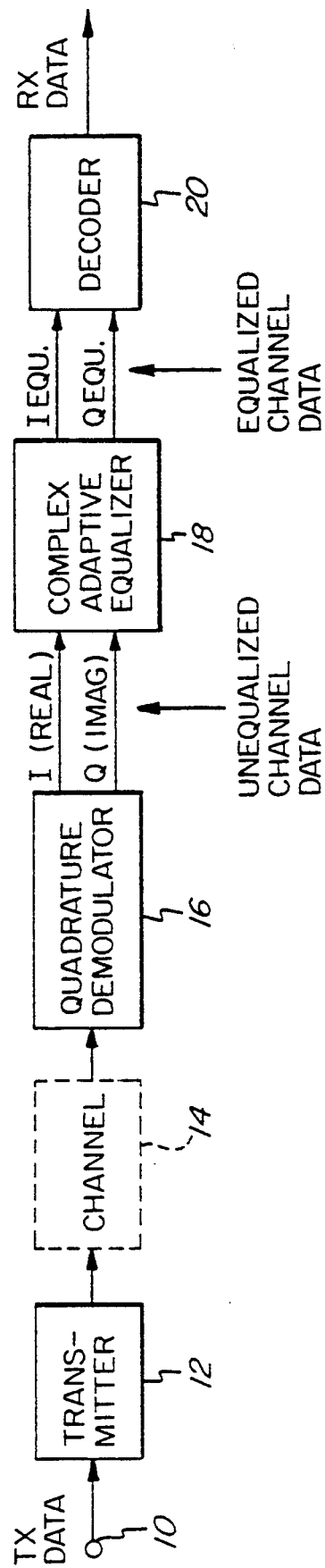
FIG. 1 is a block diagram of a typical transmission system illustrating the location of an adaptive equalizer.

In the transmission system illustrated in FIG. 1, a signal to be transmitted is input to a transmitter 12 via an input terminal 10. The signal contains digital data, modulated on an analog carrier using, for example, well known QAM techniques. The QAM modulated data is a complex signal that includes real components I and imaginary components Q. Transmitter 12 is a conventional device, such as a well known VHF or UHF transmitter.

The transmitted signal is communicated via a channel 14, such as a terrestrial VHF or UHF communications channel, to a receiver that contains a quadrature demodulator 16 for the QAM data. Quadrature demodulator 16 is a conventional component that extracts the I and Q components of the received data for input to a complex adaptive equalizer 18. Adaptive equalizers, per se, are well known in the art. The present invention provides an accumulator that can be used, for example, in an adaptive equalizer.

As illustrated in FIG. 1, the received channel data input to complex adaptive equalizer 18 is unequalized, and suffers from the intersymbol interference caused by the amplitude and/or delay distortion introduced by communication channel 14. Adaptive equalizer 18 compensates for this distortion, and outputs equalized channel data $I_{equ}$ and $Q_{equ}$. The equalized channel data is input to a conventional decoder 20 to retrieve the transmitted information data, which can comprise, for example, HDTV video information.

Figure 2:
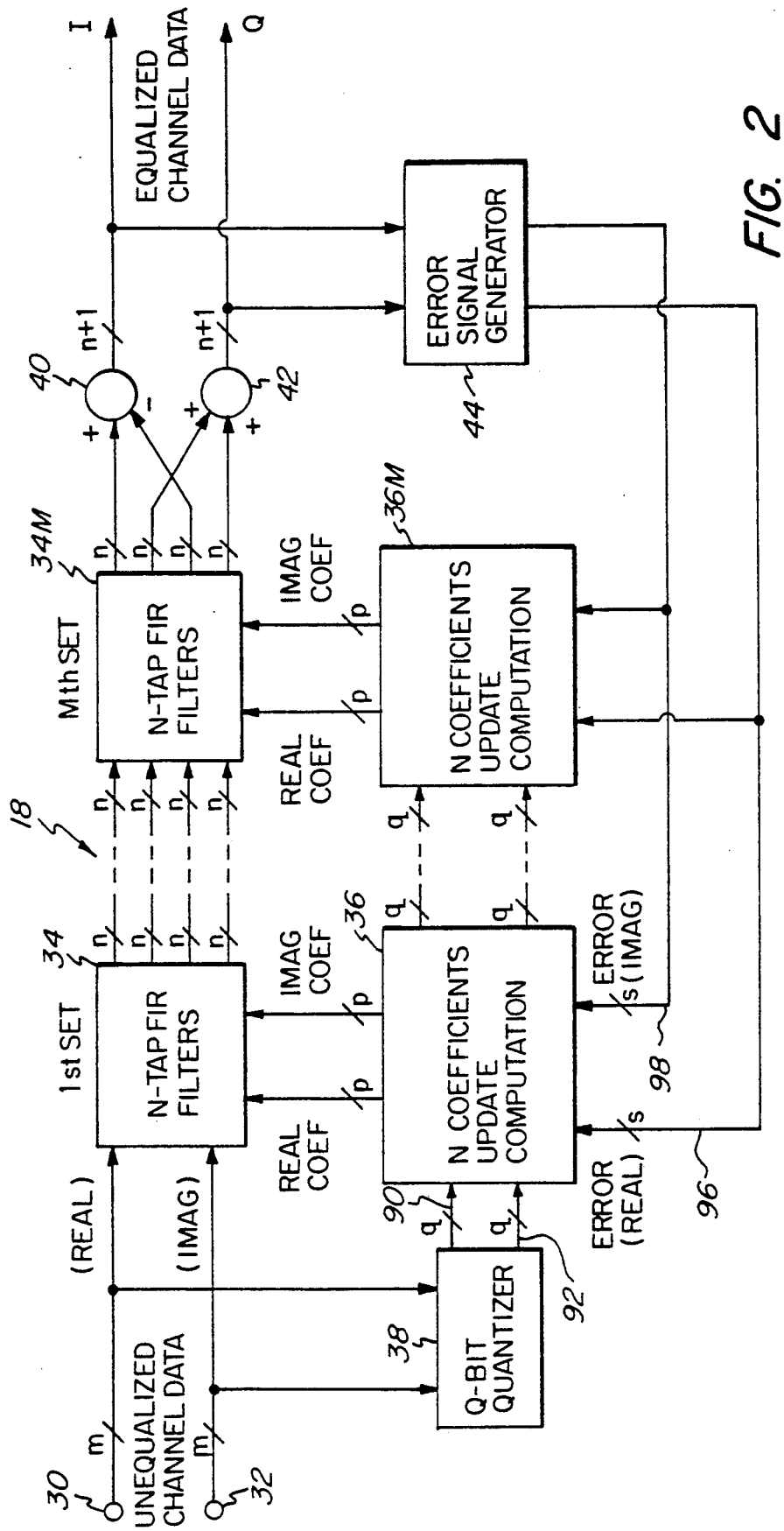
FIG. 2 is a block diagram of a multi-tap complex adaptive equalizer using cascaded components.

FIG. 2 illustrates an embodiment of complex adaptive equalizer 18 in greater detail. Unequalized channel data from the quadrature demodulator is input at terminals 30, 32 respectively. Terminal 30 receives the real (I) demodulated channel data and terminal 32 receives the imaginary (Q) demodulated channel data. Each of the demodulated I and Q signals comprise m-bit bytes that are input both to a first stage 34 of N-tap finite impulse response (FIR) filters and a q-bit quantizer 38. Quantizer 38 quantizes each m-bit byte into a smaller byte for input to an N-coefficients update computation circuit 36.

As shown in FIG. 2, equalizer 18 comprises M sets or stages, each containing an N-tap FIR filter circuit and an N-coefficients update computation circuit. After the last (Mth) stage, the outputs from the last N-tap FIR filter circuit are combined in adders 40, 42 to provide the real equalized channel data I and the imaginary equalized channel data Q. The equalized I and Q data is also input to an error signal generator 44, which outputs an error signal that is fed back to each of the update computation circuits 36 to 36 . In a preferred embodiment, error signal generator 44 comprises a programmable read only memory (PROM) that outputs a precalculated stored error value in response to the Q and I data that is used to address the PROM. The stored error values have been previously computed using the well known LMS algorithm.

Figure 3:
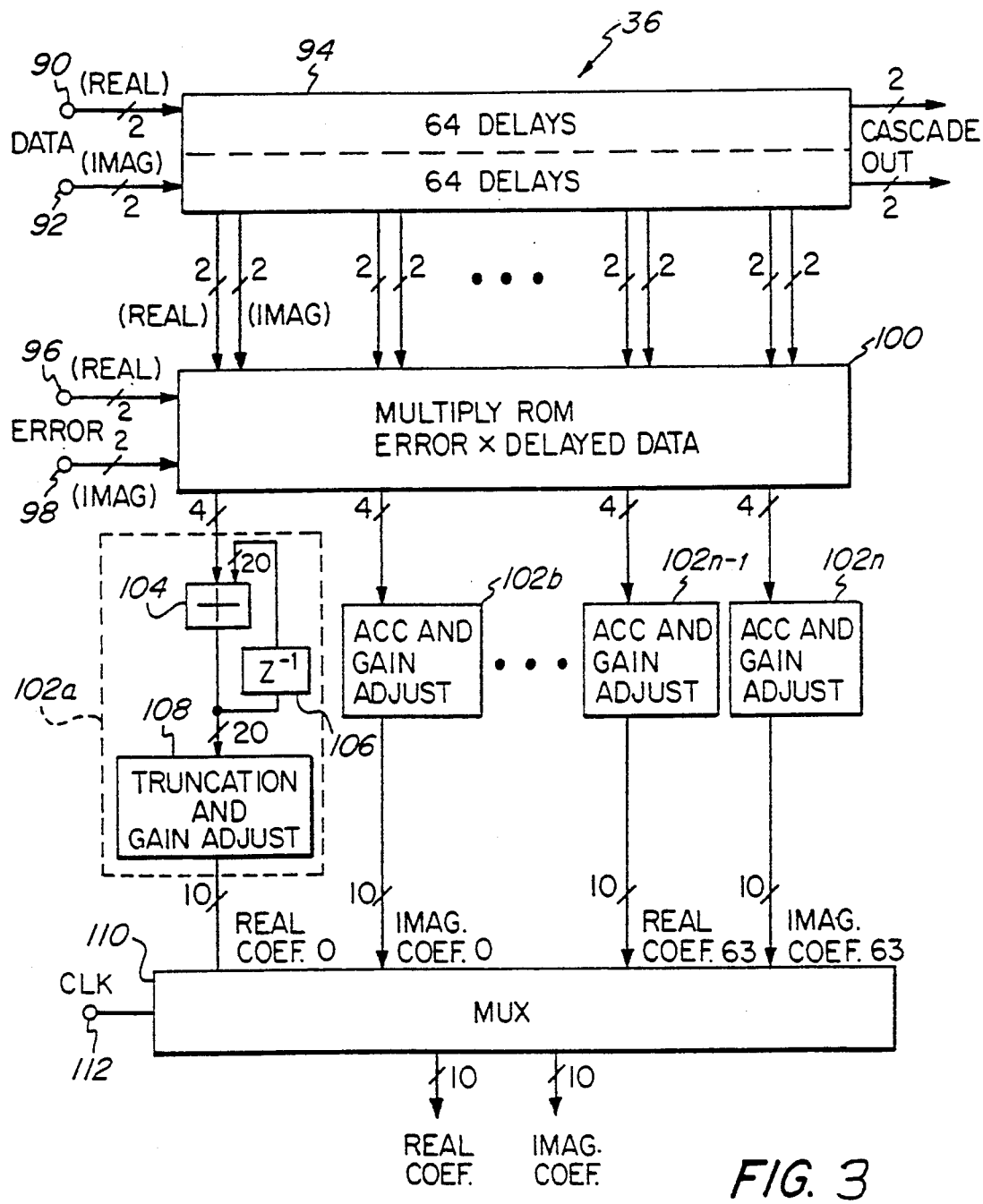
FIG. 3 is a block diagram of a coefficient update computation circuit that uses a long bit adder as an accumulator in each of a plurality of parallel processing paths.

FIG. 3 illustrates a 64 tap complex coefficient update computation circuit 36 in which the accumulator of the present invention can be utilized. Two-bit quantized unequalized complex data (real and imaginary) is input at terminals 90 (real) and 92 (imaginary). Similarly, the two-bit quantized real and imaginary components of a complex error signal are input at terminals 96, 98 respectively. Sixty-four cascaded delay stages 94 receive the real and imaginary data for input, along with the error signals, as addresses to a multiply read-only memory (ROM) that obtains the product of each data component with each error component for input to an accumulator and gain adjust circuit associated with the particular delay stage from which the data was output. Circuit 102a is an example of one of the accumulator and gain adjust circuits.

As can be seen in FIG. 3, each accumulator and gain adjust circuit 102a to 102n includes a 20-bit accumulator 104 that sums the respective product from multiply ROM 100 with a delayed product output from delay circuit 106. Delay circuit 106 outputs 20-bit delayed coefficients. The 20-bit accumulator is used to update the coefficients. After accumulation, the coefficients are truncated and gain adjusted in a conventional truncation and gain adjust circuit 108. The gain adjustment adjusts the magnitude of the coefficients. A multiplexer 110 receives all of the coefficients from each stage, multiplexes them together, and selects one set for output each clock cycle. A clock input 112 is provided to input the clock signal to multiplexer 110.

As noted above, a 20-bit accumulator such as accumulator 104 illustrated in FIG. 3 is costly to implement in an integrated circuit due to the amount of space the accumulator takes up. The present invention overcomes this problem by providing a two stage accumulator as illustrated in FIG. 4.

Figure 4:
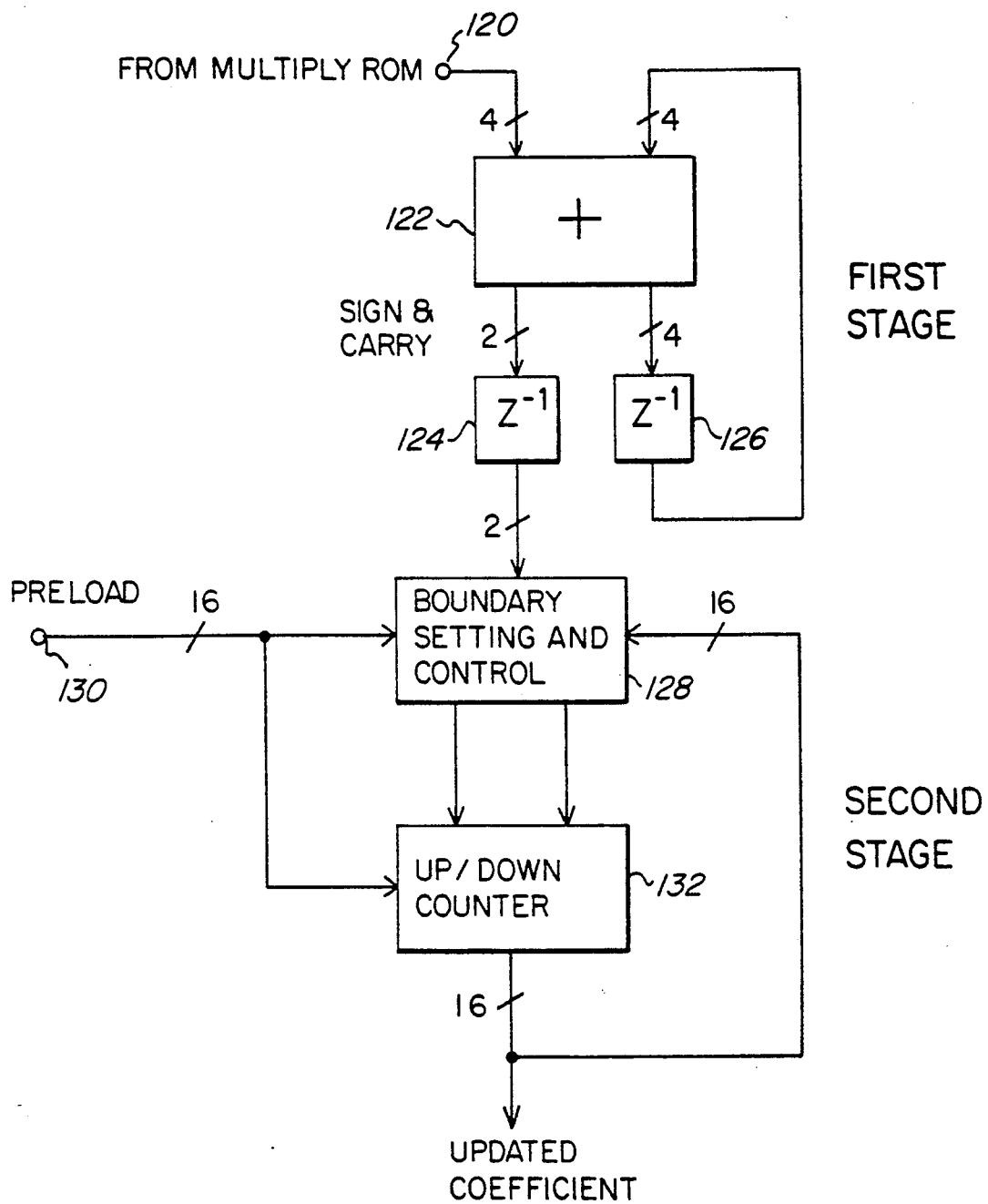
FIG. 4 is a block diagram of a two stage accumulator in accordance with the present invention that can replace the accumulator illustrated in FIG. 3.

The embodiment illustrated in FIG. 4 is used to update coefficients having a length of 20 bits. It should be appreciated that the specific embodiment illustrated is only an example, and the present invention can be used to implement a two stage accumulator for coefficients of any length. In the illustrated embodiment, a first stage comprising adder 122 and delay circuits 124, 126 comprise the first stage of the accumulator. The first stage processes the least significant four bits of each 20-bit coefficient. The second stage of the accumulator includes a boundary setting and control circuit 128 and up/down counter 132. The second stage processes the remaining 16 bits of each coefficient.

First stage adder 122 receives the current error and delayed data product from multiply ROM 100 (FIG. 3) via terminal 120. This 4-bit error word is added to the prior 4-bit sum from adder 122, which is delayed by delay circuit 126. The addition produces six bits. Four of the bits comprise the sum resulting from the addition of the error word and the previous sum, and are output from a first output of adder 122 to delay stage 126. One of the two remaining bits is a sign bit and the other is a carry bit that are output from a second output of adder 122, to a delay stage 124. Delay stages 124 and 126 are conventional circuits that each provide a delay equal to one coefficient update cycle of the accumulator.

In the illustrated embodiment, adder 122 is a conventional twos complement adder. The four bits comprising the sum output from the adder correspond to the four least significant bits of the 20-bit coefficient. The 4-bit error word input to terminal 120 comprises, as its most significant bit, a sign bit. The remaining 3 bits represent the error magnitude. Ultimately, the sign bit is extended to the most significant bit of the full 20-bit coefficient.

The sign and carry bits output from delay stage 124 are input to the second stage of the accumulator via boundary setting and control circuit 128. This circuit comprises a comparator that determines whether the current magnitude of the sixteen most significant bits of the coefficient is within a predetermined range. If so, the sign and carry bits will determine whether the up/down counter 132 should be incremented, decremented, or maintained at its current value according to the following table:

| Sign | Carry | Up/Down Counter |
|------|-------|-----------------|
| 0 | 0 | no change |
| 0 | 1 | count up 1 |
| 1 | 0 | count down 1 |
| 1 | 1 | no change |

As can be seen, if the sign bit is a 0 and the carry bit is a 1, boundary setting and control circuit 128 will cause up/down counter 132 to count up by 1. If the sign bit is a 1 and the carry bit is a 0, the up/down counter 132 will be actuated to count down by 1. If the sign and carry bits are the same, up/down counter 132 will remain at its current value.

The action of up/down counter 132 will update the sixteen most significant bits of the 20-bit coefficient. The current updated coefficient is fed back from the output of up/down counter 132 to the input of boundary setting and control circuit 128 for a determination, during the next coefficient update cycle, as to whether the coefficient has exceeded its upper permitted bound or dropped below its lower permitted bound. If this occurs, circuit 128 will not actuate up/down counter 132 to increment above or decrement below the boundary. By limiting the range of the coefficient in this manner, the coefficient will not grow unbounded.

Another function of boundary setting and control circuit 128 is to provide a "leakage function." During the operation of an adaptive equalizer, the coefficient update routine will eventually reach a steady state. However, if the steady state is reached too quickly, the equalization may not be stable. Therefore, it is advantageous to introduce "leakage" to effectively slow down the update of the coefficient, thereby stabilizing the adaptive equalizer.

The present invention enables a leakage function to be implemented in a very straightforward manner. Specifically, boundary setting and control circuit 128 can include a first counter to keep track of the number of increments provided by up/down counter 132 and a second counter to keep track of the number of decrements provided by the counter. After the first counter counts X increments, the next increment that would otherwise be effected by up/down counter 132 will be skipped. Similarly, after the second counter counts Y decrements, the next decrement that would otherwise be effected by the up/down counter will be skipped. After an increment or decrement is skipped, the respective first or second counter is reset. Thus, an increment will be skipped every X times and a decrement will be skipped every Y times. X and Y can each be any number, depending on the specific implementation, and can be the same or different.

By periodically skipping increments and decrements as indicated above, the updating of the coefficient will be slowed down, since certain update cycles will be wasted. As noted above, this procedure will prevent the coefficient from reaching a steady state value too quickly, thereby stabilizing the equalizer.

As indicated in FIG. 4, boundary setting and control circuit 128 and up/down counter 132 are preloaded via terminal 130 with initialization data for at least a portion of the sixteen most significant bits of the 20-bit coefficient. Preloading of the boundary setting and control circuit provides stability for the coefficient update process. Preloading of the up/down counter facilitates proper echo cancellation when the accumulator is used in an adaptive equalizer. The problem of echo cancellation in an adaptive equalizer is discussed in the article to S. U. H. Qureshi referred to above.

When the two stage accumulator of the present invention is used in the adaptive equalizer illustrated in FIG. 3, the updated coefficient output from up/down counter 132 during each coefficient update cycle is input to truncation and gain adjust circuit 108. Since the updated coefficient is truncated anyway, only the sixteen MSB's of the 20-bit coefficient need to be passed on to the truncation stage. However, in an embodiment where the full 20-bit coefficient is necessary for further processing, the four bits output from delay stage 126 of the first accumulator stage can be appended as LSB's to the 16 bits output from up/down counter 132 to form the full 20-bit coefficient.

Figure 5:
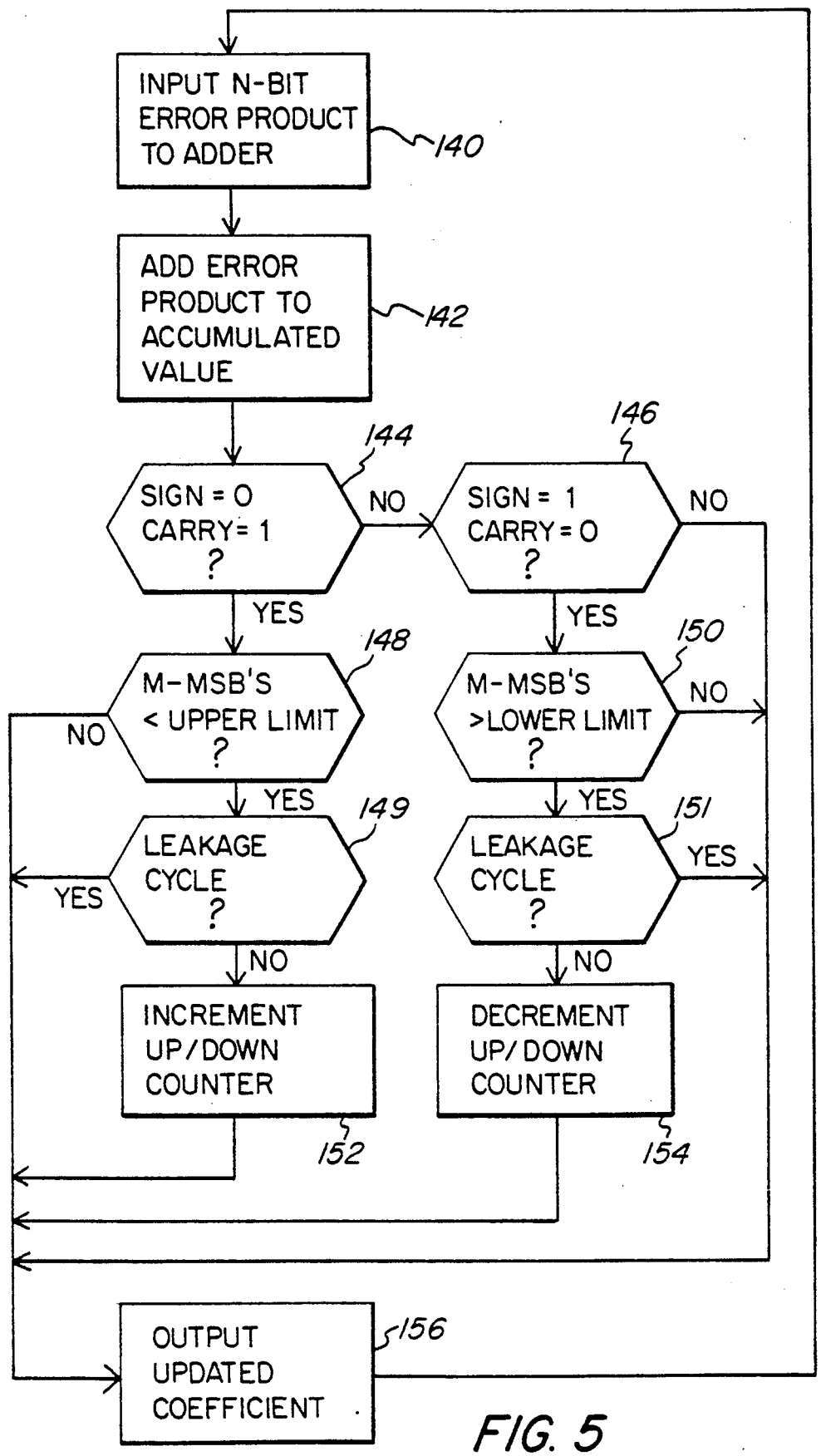
FIG. 5 is a flow chart illustrating the operation of the two stage accumulator of FIG. 4.

FIG. 5 is a flow chart illustrating the operation of the two stage accumulator of the present invention. As indicated at box 140, processing commences with the input of an N-bit error product to the adder. With reference to FIG. 4, this corresponds to the input of the error word at terminal 120. At box 142, the N-bit error product is added to the accumulated value of the four LSB's output from delay stage 126.

The sign and carry bits output from the first stage of the accumulator are tested at box 144 to determine if the sign is a 0 and the carry is a 1. If so, the up/down counter will be incremented if two additional tests are met. First, a determination is made at box 148 as to whether the M (e.g., 16) most significant bits of the coefficient are below their upper boundary limit. If so, a determination is made at box 149 as to whether the current coefficient update cycle is a leakage cycle, i.e., a cycle during which the next increment of the up/down counter is to be skipped. If this is not the case, the up/down counter is incremented at box 152. If either of the tests at boxes 148 or 149 are not met, the counter is not incremented.

If the test performed by box 144 is not met, box 146 will make a determination as to whether the sign bit is a 1 and the carry bit is a 0. If so, box 150 tests the M most significant bits to determine if they are greater than the lower boundary limit. If so, box 151 determines whether the current coefficient update cycle is one where the decrementing of the up/down counter is to be skipped. If not, the up/down counter is decremented at box 154. Otherwise, the up/down counter will not be decremented.

After the appropriate action, if any, has been taken by the up/down counter, the updated coefficient will be output as indicated at box 156. The procedure then returns to box 140, where the next coefficient update cycle is commenced with the input of a new N-bit error product to the adder.

It should now be appreciated that the present invention separates an M-bit coefficient update circuit into a two-level function. The first level is an N-bit adder which implements the update of the total dynamic range of an error signal. The error signal is derived from at least a portion of the coefficient updated during a previous coefficient update cycle. The remaining (M-N) most significant bits of the M-bit coefficient are updated using only the sign and carry bits from the first level. The sign and carry bits provide information as to whether the remaining bits should be incremented, decremented, or left at their current value. They can also be used for leakage control. In an illustrated embodiment, leakage control is provided using separate counters that keep track of how many times the coefficient has been incremented and how many times it has been decremented. Based on these counts, the incrementing and decrementing functions will periodically be skipped. After the skipping of a cycle, the respective increment or decrement counter is reset.

Although the invention has been described in connection with a specific embodiment thereof, those skilled in the art will appreciate that numerous adaptations and modifications may be made thereto without departing from the spirit and scope of the invention as set forth in the claims.

We claim:

1. A two stage accumulator for use in updating coefficients comprising:
    a first stage including an adder coupled to receive an error word and an N-bit least significant bit portion of a larger M-bit coefficient to be updated; said first stage outputting sign and carry bits resulting from the addition of said error word and said N-bit least significant bit portion;
    a second stage responsive to said sign and carry bits from said first stage for updating the (M-N) most significant bits of said M-bit coefficient; and
    means for cyclically providing new error words to said first stage during successive coefficient update cycles.

2. An accumulator in accordance with claim 1 wherein:
    said new error words are derived from at least a portion of an M-bit coefficient updated during a previous coefficient update cycle,
    said first stage adds the new error word received during a coefficient update cycle to the N least significant bits of said M-bit coefficient from said previous coefficient update cycle to provide said sign and carry bits, and
    said second stage is responsive to the sign and carry bits output from said first stage during each cycle to update the (M-N) most significant bits of said M-bit coefficient from the previous coefficient update cycle.

3. An accumulator in accordance with claim 2 wherein said error word is an N-bit word and said first stage comprises:
an N-bit twos complement adder for adding said error word and said N-bit least significant bit portion to produce a sign bit, a carry bit, and an N-bit sum;
means for delaying said sign and carry bit for input to said second stage during a subsequent coefficient update cycle; and
means for delaying said N-bit sum for input to said adder as said N-bit least significant bit portion during said subsequent coefficient update cycle.

4. An accumulator in accordance with claim 3 wherein said second stage comprises:
an up/down counter for selectively incrementing or decrementing said (M-N) most significant bits depending on the state of said sign and carry bits during a current coefficient update cycle.

5. An accumulator in accordance with claim 4 further comprising:
means for inhibiting the incrementing of said (M-N) most significant bits when such incrementing would cause the (M-N) most significant bits to exceed an upper boundary; and
means for inhibiting the decrementing of said (M-N) most significant bits when such decrementing would cause the (M-N) most significant bits to drop below a lower boundary.

6. An accumulator in accordance with claim 2 wherein said second stage comprises:
an up/down counter for selectively incrementing or decrementing said (M-N) most significant bits depending on the state of said sign and carry bits during a current coefficient update cycle.

7. An accumulator in accordance with claim 6 further comprising:
means for inhibiting the incrementing of said (M-N) most significant bits when such incrementing would cause the (M-N) most significant bits to exceed an upper boundary; and
means for inhibiting the decrementing of said (M-N) most significant bits when such decrementing would cause the (M-N) most significant bits to drop below a lower boundary.

8. An accumulator in accordance with claim 7 further comprising means for preloading said up/down counter, said means for inhibiting the incrementing and said means for inhibiting the decrementing with initialization data for at least a portion of the (M-N) most significant bits of said M-bit coefficient during an accumulator initialization cycle.

9. An accumulator in accordance with claim 6 further comprising means for preloading said up/down counter with initialization data for at least a portion of the (M-N) most significant bits of said M-bit coefficient during an accumulator initialization cycle.

10. An accumulator in accordance with claim 1 further comprising means for preloading said second stage with initialization data for at least a portion of the (M-N) most significant bits of said M-bit coefficient during an accumulator initialization cycle.

11. A two stage accumulator for use in updating coefficients comprising:
an N-bit twos complement adder having a first input coupled to receive an N-bit error word, a second input coupled to receive a previous N-bit portion of a sum from said adder representing the N least significant bits of an M-bit coefficient being cyclically updated, a first output for outputting a new N-bit portion of a sum resulting from the addition of said error word and said previous N-bit portion, and a second output for outputting sign and carry bits resulting from said addition;
up/down counter means responsive to the sign and carry bits from said second output for updating the (M-N) most significant bits of said M-bit coefficient; and
means for cyclically providing new error words to said adder for updating said M-bit coefficient.
means for cyclically providing new error words to said adder for updating said M-bit coefficient.

12. An accumulator in accordance with claim 11 wherein said up/down counter means selectively increment or decrement said (M-N) most significant bits depending on the state of said sign and carry bits during a current coefficient update cycle.

13. An accumulator in accordance with claim 12 further comprising:
first leakage function means responsive to the number of incrementing cycles of said up/down counter over time for causing said up/down counter to periodically skip an incrementing cycle; and
second leakage function means responsive to the number of decrementing cycles of said up/down counter over time for causing said up/down counter to periodically skip a decrementing cycle.

14. An accumulator in accordance with claim 13 further comprising:
means for inhibiting the incrementing of said (M-N) most significant bits when such incrementing would cause the (M-N) most significant bits to exceed an upper boundary; and
means for inhibiting the decrementing of said (M-N) most significant bits when such decrementing would cause the (M-N) most significant bits to drop below a lower boundary.

15. An accumulator in accordance with claim 14 comprising:
first delay means coupled to the first output of said adder for delaying said new N-bit portion for input to the second input of said adder during a subsequent cycle; and
second delay means coupled to the second output of said adder for delaying said sign and carry bits for use in controlling said up/down counter during said subsequent cycle.

16. An accumulator in accordance with claim 12 further comprising:
means for inhibiting the incrementing of said (M-N) most significant bits when such incrementing would cause the (M-N) most significant bits to exceed an upper boundary; and
means for inhibiting the decrementing of said (M-N) most significant bits when such decrementing would cause the (M-N) most significant bits to drop below a lower boundary.

17. An accumulator in accordance with claim 11 comprising:
first delay means coupled to the first output of said adder for delaying said new N-bit portion for input to the second input of said adder during a subsequent cycle; and second delay means coupled to the second output of said adder for delaying said sign and carry bits for use in controlling said up/down counter during said subsequent cycle.

18. A two stage accumulator for use in updating coefficients comprising:

a first stage including an adder coupled to receive an error word and an N-bit least significant bit portion of a larger M-bit coefficient to be updated; said first stage outputting sign and carry bits resulting from the addition of said error word and said N-bit least significant bit portion;

a second stage including an up/down counter for selectively incrementing or decrementing the (M-N) most significant bits of said M-bit coefficient depending on the state of said sign and carry bits during a current coefficient update cycle;

first leakage function means for causing said up/down counter to periodically skip an incrementing cycle;

second leakage function means for causing said up/down counter to periodically skip a decrementing cycle; and means for cyclically providing new error words to said first stage during successive coefficient update cycles.

19. An accumulator in accordance with claim 18 further comprising:

means for inhibiting the incrementing of said (M-N) most significant bits when such incrementing would cause the (M-N) most significant bits to exceed an upper boundary; and means for inhibiting the decrementing of said (M-N) most significant bits when such decrementing would cause the (M-N) most significant bits to drop below a lower boundary.

20. An accumulator in accordance with claim 19 wherein:

said first leakage function means are responsive to the number of incrementing cycles of said up/down counter over time; and said second leakage function means are responsive to the number of decrementing cycles of said up/down counter over time.

* * * * *